Aug. 5, 1952        H. A. BROCK        2,606,078
PRUNING AND PICKING PLATFORM IMPLEMENT
Filed June 11, 1948        3 Sheets-Sheet 1
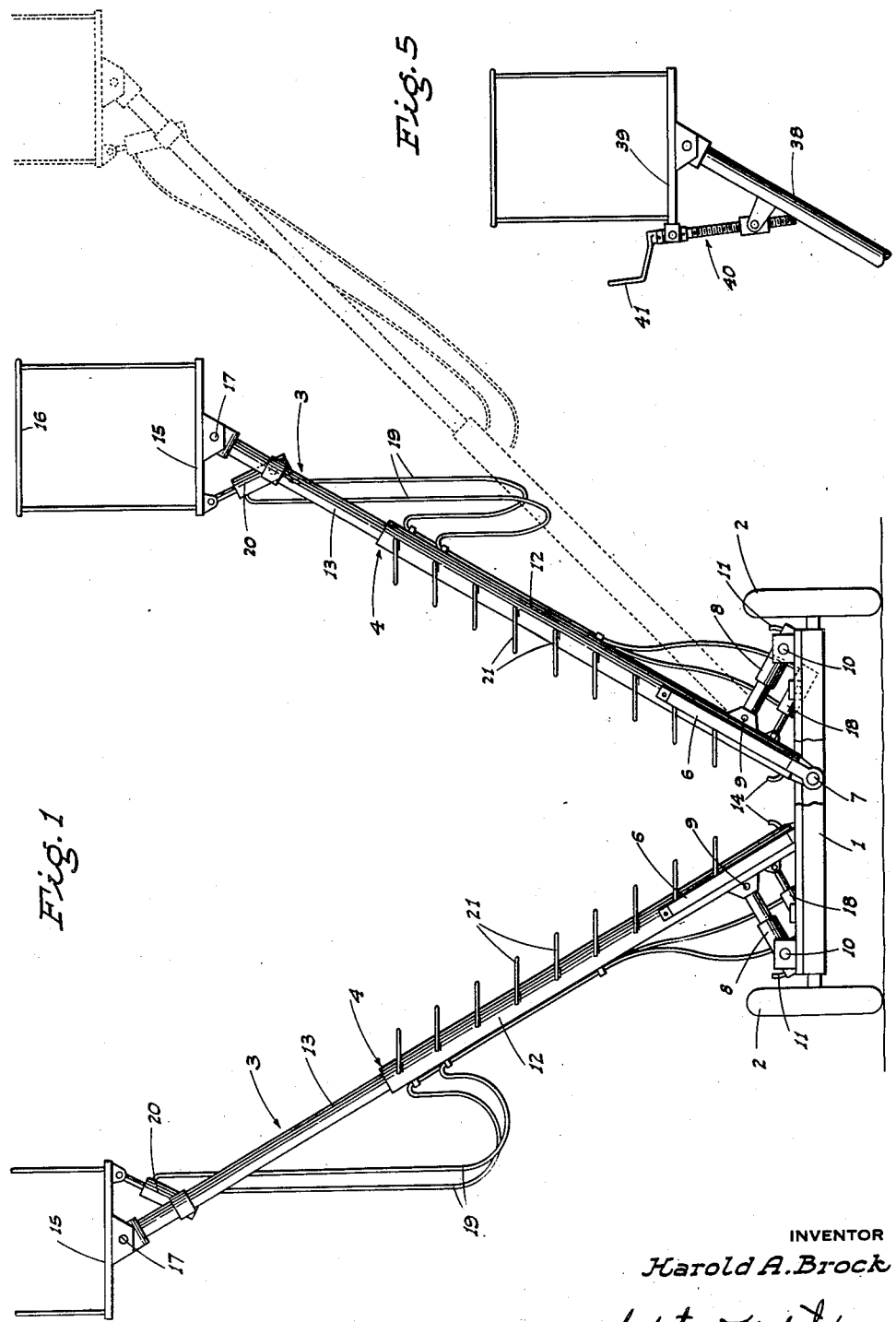
INVENTOR
*Harold A. Brock*
BY *(signature)*
ATTORNEYS Aug. 5, 1952 — H. A. BROCK — 2,606,078
PRUNING AND PICKING PLATFORM IMPLEMENT
Filed June 11, 1948 — 3 Sheets-Sheet 2
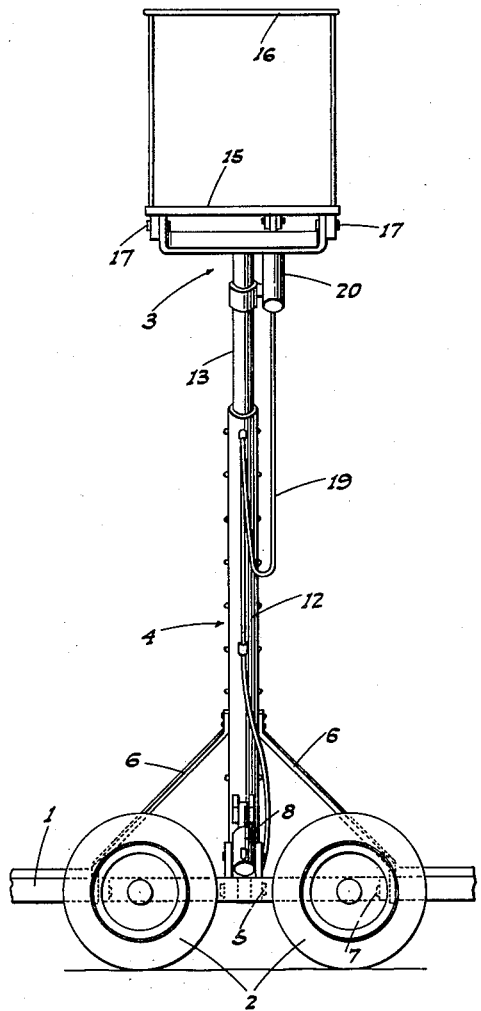
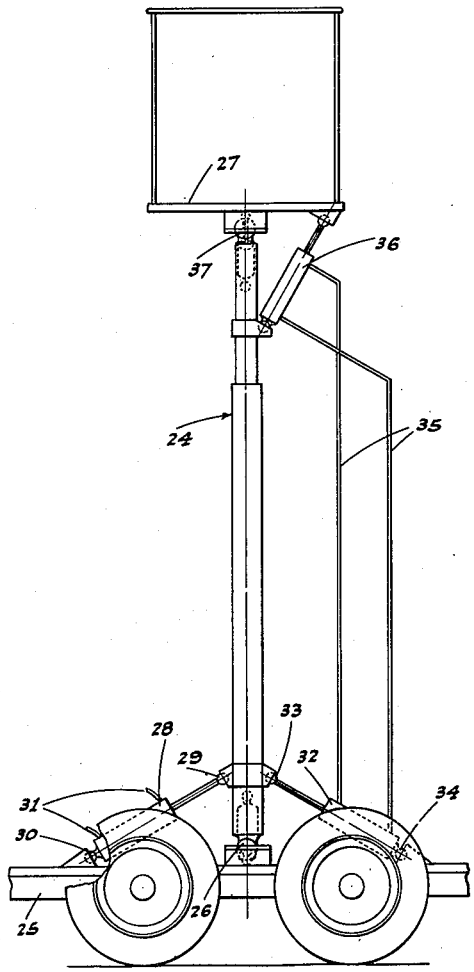
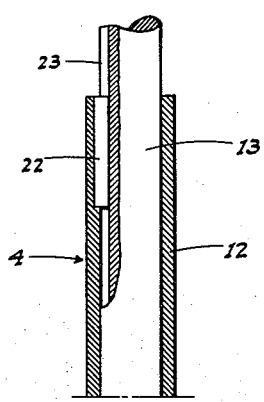
INVENTOR
Harold A. Brock
BY
ATTORNEYS Aug. 5, 1952      H. A. BROCK      2,606,078
PRUNING AND PICKING PLATFORM IMPLEMENT Filed June 11, 1948      3 Sheets-Sheet 3

INVENTOR
Harold A. Brock
BY
ATTORNEYS

Patented Aug. 5, 1952

2,606,078

UNITED STATES PATENT OFFICE 2,606,078

PRUNING AND PICKING PLATFORM
IMPLEMENT

Harold A. Brock, Smithflat, Calif., assignor, by
mesne assignments, to Capital Industries, Inc.,
Portland, Oreg., a corporation of Oregon Application June 11, 1948, Serial No. 32,339

4 Claims. (Cl. 304—29)

This invention is directed to, and it is an object to provide, a portable and adjustable, elevated platform implement adapted to support a worker, at selective height or position, for pruning orchard trees, or for picking a crop therefrom.

A further object of the invention is to provide a pruning and picking platform implement which is wheel-supported for ease and convenience of movement through an orchard; there being an upstanding mast on the implement supporting a platform unit on its upper end.

Another object of the invention is to provide a pruning and picking platform implement, as above, in which the mast is adjustable to place the platform unit in selective positions, and said unit also being adjustable to maintain it horizontal or level, as is desirable.

An additional object of the invention is to provide a pruning and picking platform implement, as in the preceding paragraph, in which there is an automatic leveling device connected to the platform unit operative to compensate for mast adjustment and to hold said platform unit substantially horizontal at all times.

It is also an object of the invention to provide a pruning and picking platform implement which is practical and reliable; the implement facilitating pruning or crop picking operations, and eliminating the loss of time and effort otherwise required to move heavy and cumbersome ladders through the orchard. With the present implement the ladders are eliminated.

A further object of the invention is to provide a relatively simple-in-structure and economical-to-manufacture pruning and picking platform, and one which will be exceedingly effective for the purpose for which it is designed.

These objects are accomplished by means of such structure and relative arrangement of parts as will fully appear by a perusal of the following specification and claims.

In the drawings:

Fig. 1 is an end elevation of the implement.

Fig. 2 is a side elevation of the same.

Fig. 3 is an enlarged fragmentary section of the telescopic mast.

Fig. 4 is a diagrammatic side elevation of a modification.

Fig. 5 is a fragmentary elevation, illustrating a manual adjustment device for one of the platform units.

Figure 6:
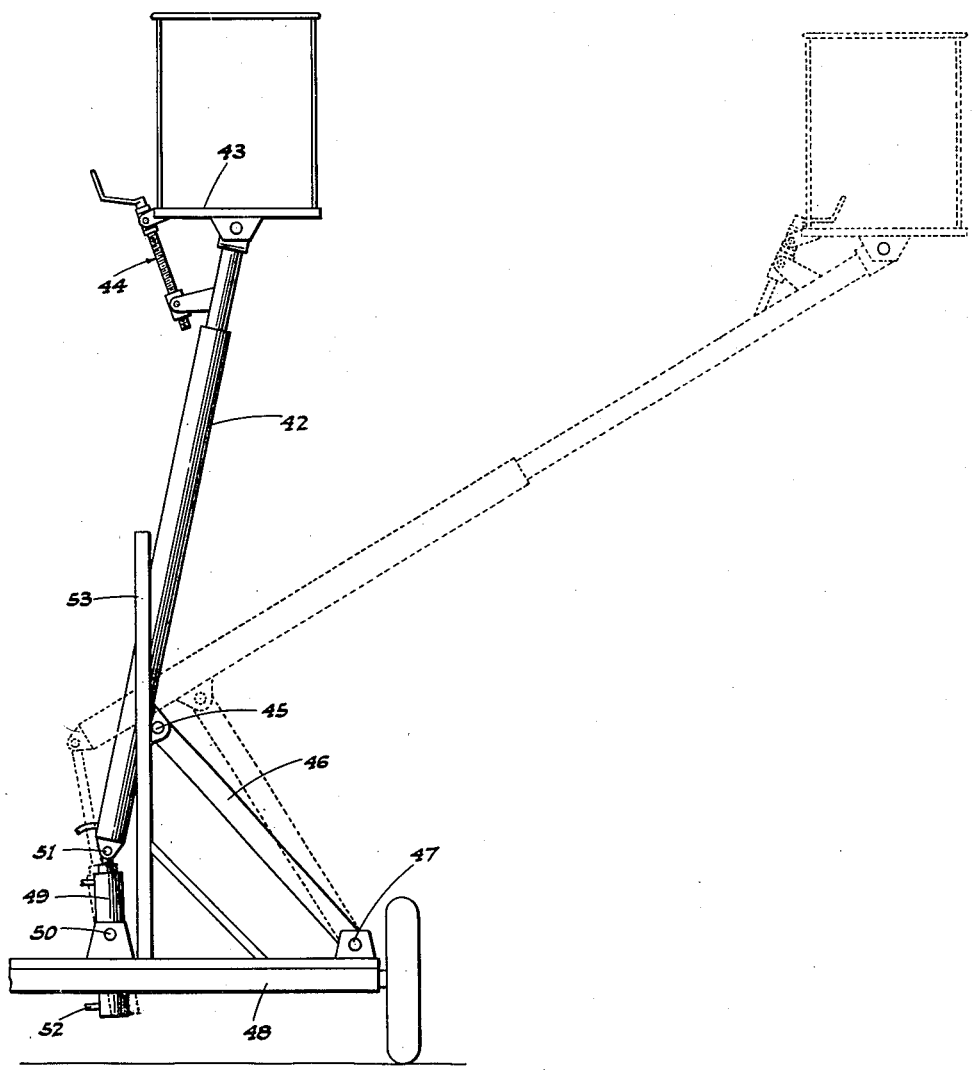
Fig. 6 is a fragmentary end elevation of a further modification of the implement.

Referring now more particularly to the characters of reference on the drawings, and at present to Figs. 1-3 inclusive, the implement comprises a main frame or bed 1 supported by pneumatic-tire wheels 2 for movement along the ground. This wheel-supported frame 1 is preferably transported from point to point along an orchard row by a tractor.

The frame 1 carries a pair of upstanding laterally swingably adjustable platform assemblies, indicated generally at 3. As said platform assemblies 3 are of identical construction, a detailed description of one will suffice for both.

Each platform assembly 3 includes a telescopic mast 4 pivoted, at its lower end, as at 5, to the frame 1, for swinging motion laterally of the direction of travel. Braces 6 extend downward in diverging relation from the mast 4 and likewise pivot, at their lower ends, to the frame 1, as at 7; the brace pivots 7 being in axial alinement with the mast pivot 5.

The telescopic mast 4 is power controlled in its position of lateral swinging adjustment by means of a fluid pressure actuated power cylinder 8 pivotally connected to the mast adjacent but short of its lower end, as at 9, and thence extending at a laterally outward and downward inclination to pivotal connection with the frame 1, as at 10.

The fluid pressure actuated power cylinder 8 is adapted to be controlled by means of a valve regulated fluid pressure conduit system, indicated in part at 11. Operation of the power cylinder 8 to cause extension or contraction thereof swings the telescopic mast 4 laterally inwardly or laterally outwardly, respectively, transversely of the direction of travel.

The telescopic mast 4 includes an elongated lower section 12 in the form of a cylinder, and an elongated upper section 13 in the form of a piston. The upper section 13, acting as the piston, is caused to slide in the lower section or cylinder 12 by introduction of fluid pressure into, or its release from, said cylinder by means of a conduit, indicated in part at 14. The conduit 14 is interposed in a fluid pressure conduit system which is suitably valve regulated.

At its upper end the telescopic mast 4 is fitted with a platform unit 15 which includes an upstanding guard rail or crow's nest 16; such platform unit 15 being pivotally mounted to the mast, as at 17, with the axis of such pivot parallel to the pivot 5 at the lower end of the mast.

The following automatic leveling device is provided, to the end that the platform unit 15 remains substantially horizontal in any selected position of lateral swinging adjustment of the mast 4.

A fluid pressure type master power cylinder 18 is pivotally connected between the telescopic mast 4 and the frame 1 generally parallel to, and adjacent, the power cylinder 8, and flexible conduits 19 lead from opposite ends of the master power cylinder 18 up the mast. Adjacent but short of its upper end the mast 4 carries a fluid pressure responsive power cylinder 20 pivotally connected between the mast and a point on the platform unit 15 laterally offset with respect to the pivot 17 of the latter. The fluid pressure responsive power cylinder 20 extends diagonally from the mast 4 to the platform unit 15, and is connected in a manner to cause said platform unit to swing about its pivot 17 upon operation of said cylinder.

The flexible conduits 19 lead upwardly to, and connect with, opposite ends of the fluid pressure responsive power cylinder 20; the connection being in opposed or reverse relation with respect to the master power cylinder 18. The system comprised of cylinders 18 and 20, and conduits 19, is thus closed and is filled with a suitable fluid, such as oil.

When the mast 4 is swung laterally outwardly or inwardly, the master power cylinder 18 is contracted or extended, causing the power cylinder 20 to respond with an opposite motion which automatically levels the platform unit 15. In other words, when the mast 4 swings laterally outwardly, the master power cylinder 18 is contracted, causing extension of the power cylinder 20 to level the platform 15. These parts work in reverse order, to level the platform unit, when the mast 4 is swung laterally inwardly.

The mast 4 carries a plurality of loop-like rungs 21 on the lower section 12 to provide a ladder so that a workman may ascend from the frame 1 to the platform unit 15.

When the above described implement is in use, it moves between the trees of an orchard row; the platform assemblies 3 being each adjusted, by lateral swinging of the corresponding mast 4, to the extent necessary to position the platform units 15 so that the worker thereon can have ready manual access to the limbs for pruning or picking of a crop. Additionally, the elevation of each platform unit 15 is accomplished through the relative adjustment of the telescopic sections 12 and 13 of said mast.

The means whereby the upper section 13 is held against rotation without limiting relative sliding thereof is illustrated in Fig. 3. This is accomplished by a longitudinal key 22 in the upper end of the lower section 12, which key rides in a keyway 23 of the upper section 13. The keyway 23 runs out or terminates above the lower end of the upper section 13, as said section is the piston which works in the lower section or cylinder 12.

In the embodiment of Figs. 1-3 inclusive, it is contemplated that each mast 4 be capable only of lateral swinging adjustment. However, under certain working conditions it may be desirable that each mast also have longitudinal swinging adjustment, and in this case the implement is modified in the manner illustrated in Fig. 4, wherein:

In this embodiment the telescopic mast 24 is swivelly mounted at its lower end on the wheel-supported frame 25, as at 26; telescopic extension of the mast 4; its lateral swinging adjustment; and the automatic leveling of the platform unit 27 to compensate for such lateral swinging adjustment being the same here as in Figs. 1-3 inclusive.

Here, however, there is a double-acting, fluid pressure actuated cylinder 28 disposed lengthwise of the direction of travel and inclined downwardly from the mast 24 above its lower end to the main frame 25; said cylinder 28 being swivelly connected by ball and socket units 29 and 30 to said mast and frame, respectively.

The cylinder 28 is controlled by a valve-regulated, fluid pressure conduit system, indicated in part at 31.

Upon operation of the cylinder 28 it swings the mast 24 lengthwise of the direction of travel, to thereby provide a further adjustment of the implement and to increase its flexibility or range. This embodiment of the invention likewise includes an automatic leveling device to compensate for the longitudinal swinging adjustment of the mast; such device comprising the following:

A master power cylinder 32 extends lengthwise of the direction of travel on the opposite side of the mast 24 from the cylinder 28 and is disposed at a downward incline from the mast, being swivelly connected at the ends to said mast and the main frame, respectively, by means of ball and socket units 33 and 34. A pair of flexible conduits 35 lead upwardly from the master power cylinder 32 to a fluid pressure responsive power cylinder 36 connected diagonally between the upper end portion of the mast 24 and an offset point on the platform unit 27. The cylinder 36 is disposed to work in a plane lengthwise of the direction of travel just the same as the master power cylinder 32. The platform unit 27 is mounted on the mast 24 by a ball and socket unit 27.

The system comprising the cylinders 32 and 36, together with the connecting flexible conduits 35 which couple between said cylinders, is closed and is filled with a fluid such as oil. In this case the flexible conduits 35 connect between corresponding ends of the respective cylinders so that when the mast 24 is swung lengthwise of the direction of travel in one direction or the other, the resultant contraction or extension of the master power cylinder 32 causes extension or contraction, respectively, of the power cylinder 36 to automatically level the platform unit 27.

As said platform unit 27 is swivelly mounted on the mast 24, the automatic leveling devices, which compensate for lateral swinging adjustment, and longitudinal swinging adjustment, respectively, can each function without interference by the other.

Under certain conditions, or on certain types of implements, an automatic leveling device may not be desired, and I therefore contemplate the use, under such conditions, of a manually controlled leveling device, as shown in Fig. 5. In this figure the numeral 38 indicates the upper section of a mast of an implement of the type described; there being a platform unit 39 pivotally mounted on the upper end of said section 38. A pivotally mounted, crank actuated screw unit 40 extends from the section 38 upwardly in diverging relation to said section and connects, at a laterally offset point, to the platform 39; said screw unit including an upstanding exposed crank 41. To level the platform unit 39, the worker thereon merely reaches down and actuates the crank 41, either increasing or decreasing its effective length, as necessary.

In Fig. 6 the implement is modified as follows:

The numeral 42 indicates a telescopic mast constructed in the same manner as the mast 4 of Fig. 1, and carrying, at its upper end, a pivotally mounted platform unit 43 leveled by means of a crank-actuated screw unit 44 of the type shown in Fig. 5.

Adjacent but short of its lower end the mast 42 is pivotally connected, as at 45, to the upper end of a stiff leg 46 which extends laterally at a downward incline to pivotal connection, as at 47, on one side of a wheel-supported main frame 48 of the implement.

Intermediate its sides the frame 48 carries an upstanding, fluid pressure actuated power cylinder 49 pivoted, intermediate its ends, as at 50, in connection with said frame. At its upper end the power cylinder 49 is pivoted to the lower end of the mast 42, as at 51. The power cylinder 49 is double-acting and is interposed in a fluid pressure conduit system, indicated generally at 52, and which system is valve regulated. The mast 42 works between a pair of upstanding guide posts 53.

When the power cylinder 49 is extended, the lower end of the mast 42 is thrown upwardly, whereupon the pivotally mounted stiff leg 46 causes said mast to swing downwardly as per the dotted line position of Fig. 6. Conversely, contraction of the power cylinder 49 erects the mast 42, all as working conditions may require.

The hydraulic system may be arranged so that the movements of the mast, both vertically and laterally, may be controlled by the operator on the platform.

The power source for the hydraulic system may be on the tractor, or in the form of an individual power plant on the trailer itself. Also, the mast supporting vehicle may be a self-propelled unit as for instance a motor-vehicle chassis, rather than a trailer.

The above described implement, in its several modifications, provides a very practical and convenient apparatus for the support of workers about trees of an orchard at an elevated point for the purpose of pruning the trees, or picking of a crop therefrom.

The implement eliminates the need of the usual cumbersome, and difficult to move, orchard ladders, and pruning or crop harvesting is accomplished with greater facility and less cost than otherwise.

It is not intended to here enumerate all of the substantial benefits of the implement, and of which there are many in addition to those specified above.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired.

1. A pruning and picking platform implement comprising a frame supported from the ground, a mast, means pivotally mounting the mast at its lower end on the frame for swinging adjustment in a predetermined vertical plane, a platform unit, means pivotally mounting the platform unit on the upper end of the mast for leveling adjustment about an axis parallel to the axis of swinging adjustment of the mast, a fluid pressure actuated power cylinder disposed parallel to said vertical plane and connected between the frame and the mast intermediate its ends whereby to swingably adjust said mast, and an automatic leveling device, responsive to mast adjustment, connected to the platform unit; said automatic leveling device comprising a master power cylinder connected between the mast and frame, a responsive power cylinder connected between the mast and platform unit, said master cylinder and responsive cylinder being disposed parallel to said vertical plane, and a pair of conduits connecting between the ends of said master cylinder and responsive cylinder, there being a non-compressible fluid in the system comprised of said last named cylinders and conduits.

2. An adjustable elevating platform implement comprising a mast including a pair of telescopic members, a base, hinge means connecting the first of said members onto said base for permitting movement of said mast in a vertical plane, motor means connected between said base and said first member for actuating said mast in said vertical plane, motor means operatively associated with said members for effecting relative telecopic adjustment of said members, complementary cooperating means arranged between said members for precluding relative rotation of said members about the longitudinal axis thereof, a platform, hinge means mounting said platform upon the outermost end of the second of said members, the axes of said two hinge means being parallel, adjustment means connected between said platform and said second member at a point below the outermost end thereof, angle responsive means operatively connected between said base and said mast responsive to the relative angular adjustment of said mast in said vertical plane, and means operatively connecting said angle responsive means and said adjustment means for automatically effecting leveling adjustment of said platform.

3. An adjustable elevating platform implement comprising a mast including a pair of telescopic members, a base, hinge means connecting the lower one of said members onto said base for movement in a vertical plane, a platform, hinge means mounting said platform upon the outer end of the upper one of said members, adjustable bracket means connected between the upper telescopic member and said platform, angle responsive means operatively connected between said base and the lower one of said members responsive to the angle of vertical adjustment of said mast and flexible means connecting said angle responsive means and said adjustable bracket means for causing automatic adjustment of said bracket means in response to vertical adjustment of said mast for maintaining said platform substantially level irrespective of longitudinal adjustment of said mast or angle of adjustment thereof in a vertical plane.

4. An adjustable elevating platform implement comprising a mast including a pair of telescopic members, a base, hinge means mounting the lower one of said members onto said base permitting movement of said mast in a vertical plane, extensible means operatively connected between said base and the lower one of said telescopic members, said last mentioned means being extensible in proportion to the relative angular position of said mast in a vertical plane, a platform, hinge means mounting said platform upon the outermost end of the upper one of said telescopic members, extensible bracket means connected between said platform and the upper one of said telescopic members in an offset relation with respect to the hinge mounting means for said platform, and means operatively connecting said extensible means and said bracket means for operatively adjusting said bracket means automatically in response to changes in the angular position of adjustment of said mast in said vertical plane for maintaining said platform level irrespective of longitudinal adjustment of said telescopic members or angle of adjustment thereof in said vertical plane.

HAROLD A. BROCK.

REFERENCES CITED

The following references are of record in the file of this patent:

UNITED STATES PATENTS

| Number | Name | Date |
| --- | --- | --- |
| 533,059 | Harthan | Jan. 29, 1895 |
| 534,608 | Leonhardt | Feb. 19, 1895 |
| 934,748 | McPherson | Sept. 21, 1909 |
| 983,212 | Dahill | Jan. 31, 1911 |
| 1,583,772 | Blaw | May 11, 1926 |
| 1,761,726 | Havens | June 3, 1930 |
| 2,362,170 | Swaisgood | Nov. 7, 1944 |
| 2,410,030 | Horni | Oct. 29, 1946 |
| 2,450,152 | Miller | Sept. 28, 1948 |